United States Patent [19]
Sparling

[11] 3,773,262
[45] Nov. 20, 1973

[54] WELDING OF WIRES TO EACH OTHER

[76] Inventor: Arthur J. Sparling, 638 14th St., Manhattan Beach, Calif.

[22] Filed: Sept. 11, 1970

[21] Appl. No.: 71,337

Related U.S. Application Data

[63] Continuation of Ser. No. 675,148, Oct. 13, 1967, abandoned.

[52] U.S. Cl. ............... 239/291, 239/422, 239/424
[51] Int. Cl. ............................................. B05b 1/28
[58] Field of Search ...................... 239/290–301, 422, 424, 424.5; 219/76

[56] References Cited
UNITED STATES PATENTS

| | | | |
|---|---|---|---|
| 3,389,861 | 6/1968 | Nakanishi et al. | 239/424 X |
| 3,313,908 | 4/1967 | Unger et al. | 219/76 |
| 3,364,970 | 1/1968 | Dombruch et al. | 239/424.5 |
| 3,632,951 | 1/1972 | Klasson | 219/75 |
| 3,016,447 | 1/1962 | Gage et al. | 219/76 |
| 2,894,691 | 7/1959 | Sedlacsik | 239/291 X |
| 3,526,362 | 9/1970 | Jackson | 239/290 X |
| 1,842,454 | 1/1932 | Lind | 239/222 |

*Primary Examiner*—Lloyd L. King
*Attorney*—Jackson and Jones

[57] ABSTRACT

The invention relates to an improved means and process for welding wires and, more particularly, for welding lead wires to the ends of the magnet wire in small wire coils.

The invention also embraces an improved welding torch using a small-orificed burner tip and providing a sheath of shielding inert gas around the welding flame.

Improved fixture means is likewise provided for tensioning and holding the wires in intimate contact while welding or fusing. The fixturing includes a means holding one wire in tension and coiling the other thereabout. The torch is moved up to the wrapped wires to effect the weld by fusing the wires at a temperature such that the insulation first vaporizes, obviating the need for initial removal of the insulation by other means or methods. The fixture includes rotatable means to bring the two ends of the coil wire into position for making welds to the leads.

9 Claims, 8 Drawing Figures

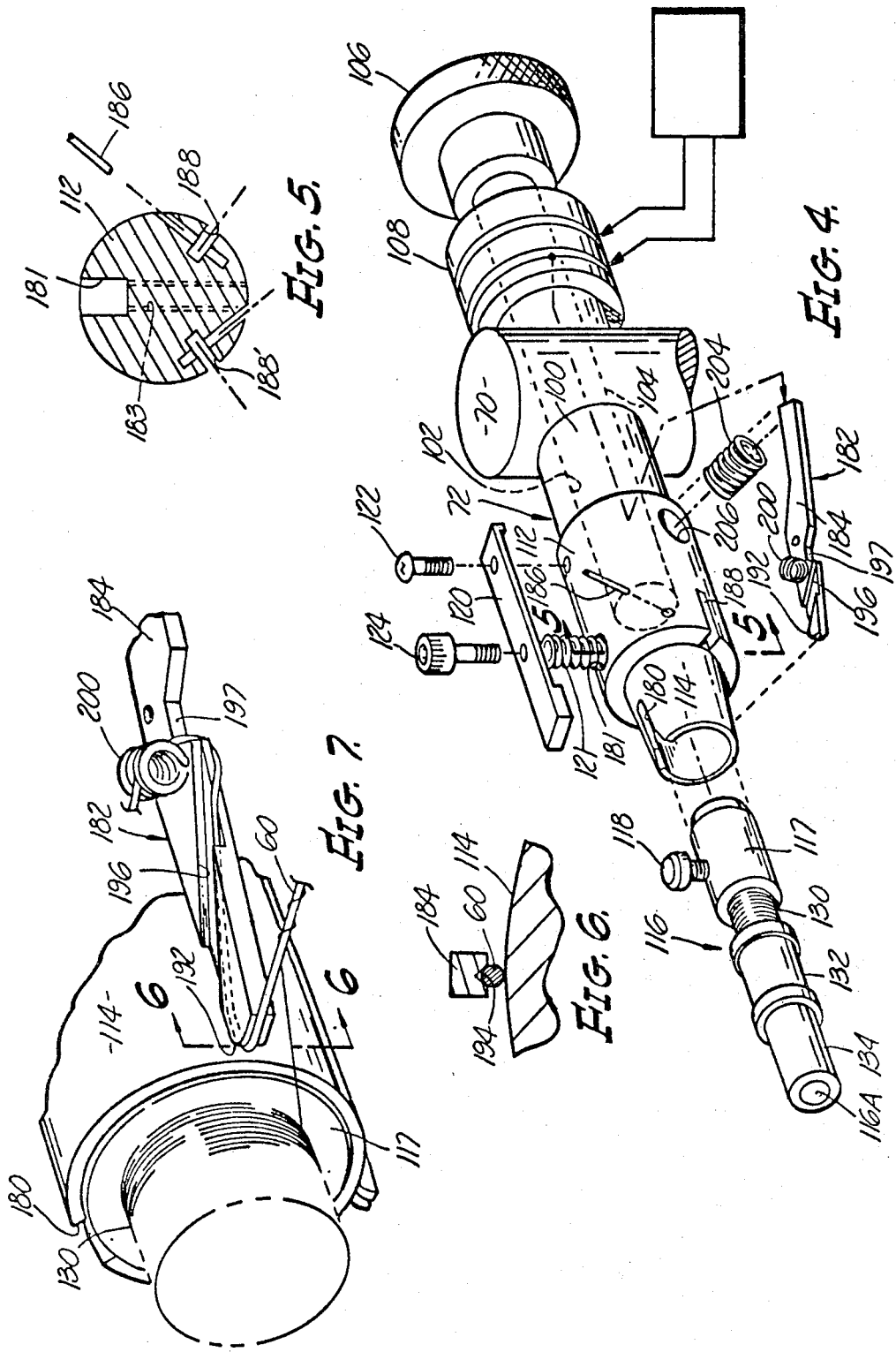

WELDING OF WIRES TO EACH OTHER

CROSS REFERENCE TO RELATED APPLICATION

This application is a continuation of application Ser. No. 675,148, filed Oct. 13, 1967, now abandoned.

SUMMARY OF THE INVENTION

This invention relates to improvements in methods and apparatus for welding wires to one another. The exemplary embodiment of the invention disclosed herein is one wherein coil leads of small diameter are welded to coil magnet wire of optionally even smaller compass, so as to produce a joint of superior mechanical and electrical strength and reliability.

By "small" is meant, for example, insulated magnet wire in the range of approximately 0.0003 to approximately 0.003-inch diameter and lead wires, for example, in the range of approximately 0.001 to approximately 0.005-inch diameter. While the means and method can handle any currently available type of magnet wire insulation, it is especially well adapted to welding Pyre ML and Teflon insulated magnet wire without the necessity of the prior removal of the insulation. These two wire types are mentioned since they are most difficult to handle by any other technique, and are currently used almost exclusively for small, high-reliability coils.

Heretofore, the preferred technique for attaching such wires was to mechanically abrade the insulation from the wire, as by hand with sandpaper or the like, then to wrap the magnet wire around the lead wire and soft solder the two. The deficiencies of this prior art technique include the need for highly skilled operators, attendant expense in terms of labor time required, excessive scrappage due to wire abrasion and breaking, poor reliability in the soldered joints, and soldering contamination.

Depending on the kind of insulation, various other techniques have been used to strip the magnet wire, including caustic agents and heat. "Teflon" and "Pyre - ML," however, were stripped primarily by manual mechanical abrasion using sandpaper or the like, as stated, because of their resistance to other removal techniques. Such insulations find perferred use, nonetheless, in hermetically sealed applications due to their low outgassing characteristics.

By this invention, the lead wire is welded to the magnet wire through the preferred use of a controlled oxygen-hydrogen flame burning within a surrounding shield of inert gas.

The oxygen-hydrogen mixture may vary from a stoichiometric mixture, supplied by the disassociation of water, to a somewhat hydrogen rich mixture supplied from bottled gases. The amount of the excess hydrogen (which will produce a reducing flame) will be limited by the tendency toward extinction of the flame during the flow of the shielding gas.

An approximately 5 percent hydrogen, 95 percent Argon shielding gas mixture is preferred. Alternative procedures for attaining the weld involves suitable techniques for a controlled means of applying heat to the wires while they are held in adjacent proximity and bathed with an inert gas shield. For example, a short length of the lead wire may be held between electrodes which pass a controlled current to achieve fusion temperature in the center of the span of wire while maintaining an inert surrounding atmosphere.

Tests of the above technique were successful although indicating that the process is less efficient than flame heating. Additional tests were conducted using a plasma as a heat source. These tests were also successful and had the advantage of a high ratio of temperature to heat content.

The tests were conducted with Pyre ML insulated magnet wire and comparison of the three processes indicates that while any heat source will work, those which have an operational mode similar to the gas flame will be best. That is to say the insulation must be vaporized prior to melting the wire and certain methods of heating, such as radiant heating or conduction from hot gases or plasmas, will be advantageous as opposed to other heating methods, such as resistance heating of the lead wire which in turn heats the magnet wire entirely by conduction. Laser, electron beam, arc, and plasma heat sources should be suitable alternatives given sufficient control on the amount of heat input. Other than the absolute necessity for accurate control of the heat energy put into the weld joint, the most important criteria whereby one heating method may be ranked as functionally superior to another would appear to be the ratio of the temperature to the heat content of the heat source. Thus, the oxygen-hydrogen flame at 6,000° F is superior to resistance heating of the lead wire itself, since the vastly hotter flame is so much more effective in vaporizing the insulation. Accordingly a laser or an electron beam, which can achieve very high ratios of temperature to heat content, is also effective as a heat source in terms of vaporizing the insulation. A plasma can also achieve very high ratios and successful tests have been performed utilizing a plasma heat source.

Fusion of the wires can also be improved if the wires are initially moistened with a small drop of a saturated solution of borax in distilled water, as an alternative or optional procedure.

Further objects and advantages of the invention will become apparent from the following detailed description and annexed drawings wherein:

FIG. 4 is a perspective partly exploded view of the mandrel or fixture which holds the coil while welding;

FIG. 5 is a sectional view taken along line 5-5 of FIG. 4;

FIG. 6 is a partial sectional view taken along line 6-6 of FIG. 7; and

FIG. 7 is a partial perspective view illustrating the manner of holding the end of the coil wire.

Figure 1:
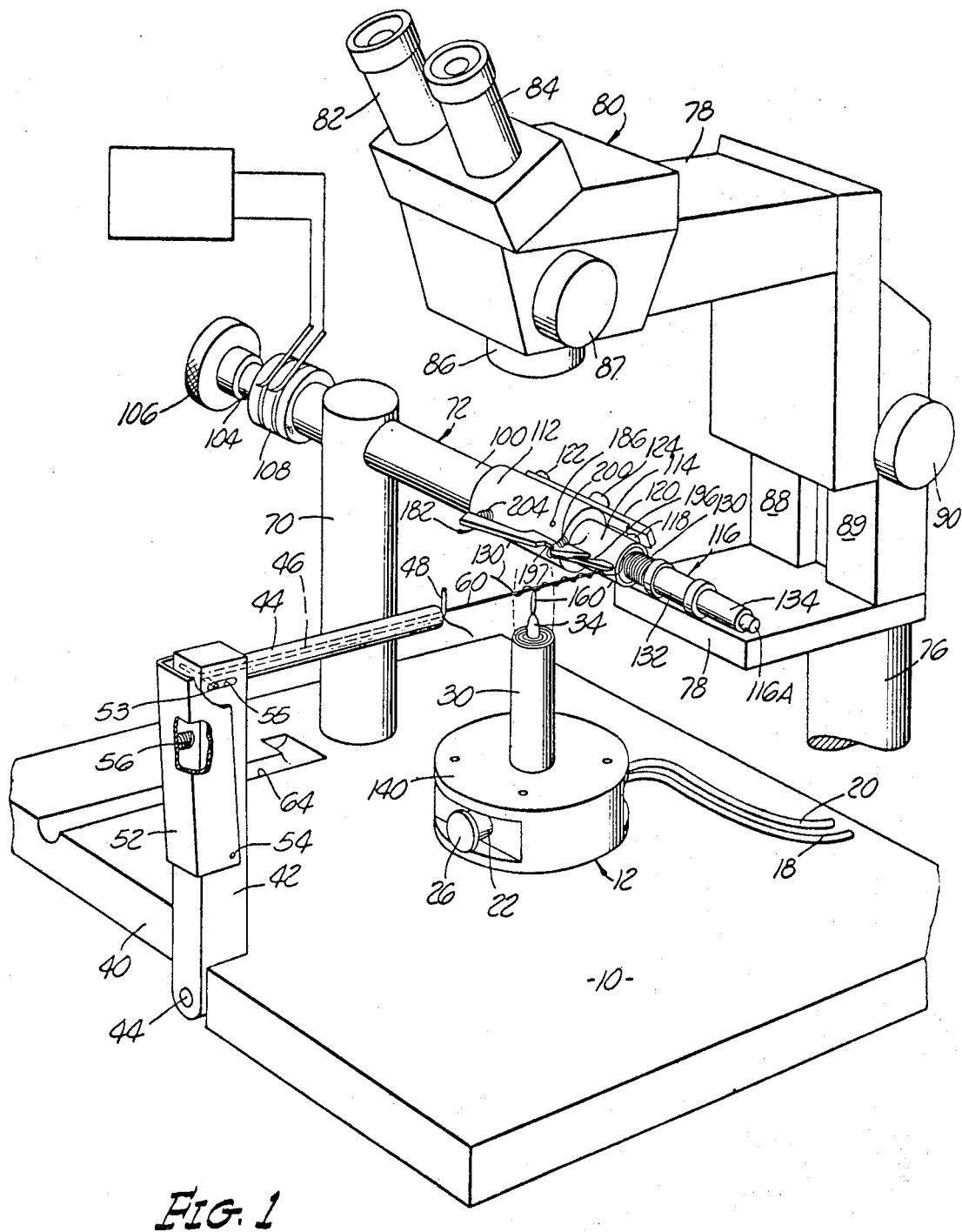
FIG. 1 is a perspective view of a preferred exemplary form, by way of example but not limitation, of a fixture set-up for carrying out the method of the invention.

In the drawings, numeral 10 designated a flat base supporting a welding torch housing 12 to which connects feed tubes 18 and 20.

Extending from the side of the housing 12 is a stem 22 having a control knob 26 for operating the shielding gas valve. At the top of the housing 12 is a cylindrical tube member 30 for the shielding gas. A suitable laminar flow element is used within the tube 30 to distribute the flow of shielding gas for uniform coverage to effectively exclude air from the welding area.

A burner tip 34 is axially aligned within tube 30, the tip preferably being in the form of a small cylinder with a 0.0075 I.D. and made from a high temperature resistance material. A further preferred feature is to have the burner tip readily replaceable without disturbing any other feature of the torch assembly.

One side edge of the base 10 is cut-out, as at 40. At the end shoulder of this cut-out, there is an upright 42 pivoted at 44 to the base. At the upper end of the upright 42 is an inwardly extending tube 44 within which is an axial stem 46 defining an upstanding arm or hook 48 at its end.

The end of the stem 46 connects to a pivoted bracket 52, preferably channel-shaped in cross-section with the sides pivoted to the stem 46 as by means of a cross pin 53 moving in a transverse slot 55 in upright 42. This bracket is also biased by a coil spring 56 normally tending to urge the stem 46 outwardly in the tube 44 and to pull hook 48 to the left in FIG. 1.

The hook 48 can engage and hold an end of the lead wire 60 that is to be welded to assist in holding such wire in tension.

Also formed in the base 10 is an optionally round-bottom channel 64, such that the upright 42 can be collapsed so that the tube 44 and hook 48 fit into the channel to provide a smoother working surface for the operator.

A cylindrical upright 70, upstanding from the base 10, holds a support tubing 100 supporting the fixture assembly 72 which holds a coil, the ends of the windings to which welds are to be made. Also, upstanding numeral 76 designated an upright having a horizontal arm or bracket 78 which supports a microscope 80 of a conventional type, preferably having dual eye-piece 82 and 84 and a lens 86 positioned so that the welding process can be observed. Knob 87 is for adjusting the magnification power. The microscope is mounted on vertical ways 88 and 89 adjustable by focusing knob 90. Preferably the microscope is mounted from a base or bench so that the welding fixture can be moved relative to it.

The fixture or holding device 72, described in more detail in connection with FIGS. 4, 5, 6 and 7, comprises a tubular support 100 extending from or through the upper end of the upright 70. The support tube has a bore 102 in which is a stem 104 operable by the manual knob 106, adjacent which is rotary commutator switch 108, for establishing an electrical circuit through the welds in the two angular positions of the holder 100 in which welds are made.

Carried on the end of the stem 104 is collet 112 having a tapered extending nose 114. Held in the nose 114 of the collet is a mandrel designated generally at 116. The end of the mandrel is received in the collet nose 114 and is held in its axial position by a screw 118.

Bearing against this screw is the end of a spring member 120 which is attached to the collet 112 by a screw 122 and which is adjustable by a screw 124 to control the pressure exerted by the end of this member against the screw 118. Coil spring 121 is in bore 181. Screw 124 threads into the tapped hole 183 in collet 112.

The coil, the ends of whose windings are to be welded, is designated at 130, being wound on the mandrel between the end of the nose 114 and a spool member 132 slidable on the mandrel shaft 116A. A sleeve 134 is fixed on the end part of the mandrel shaft. The spool 132 may be used to slide the coil axially off the mandrel after the welds are made.

Figure 2:
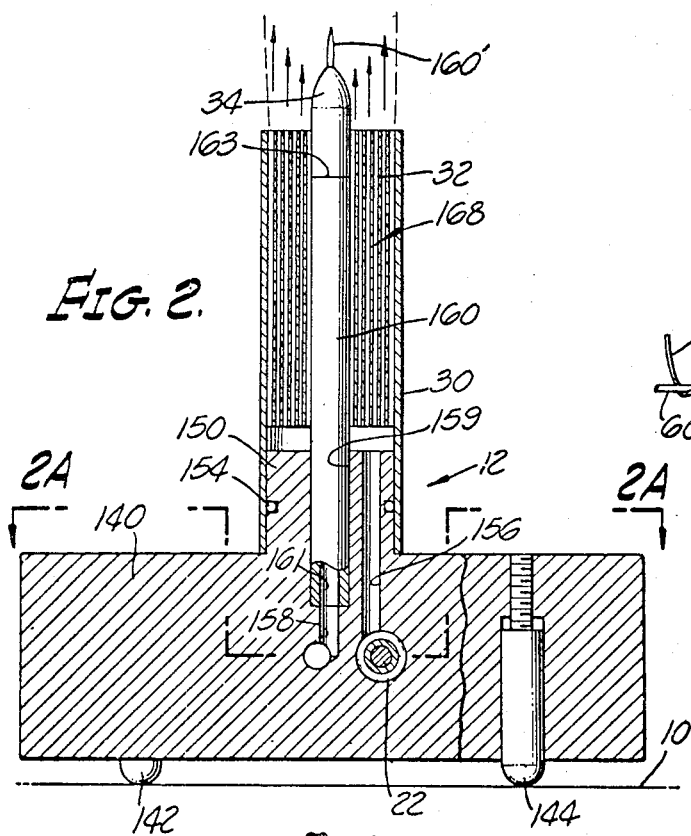
FIG. 2 is a sectional view of a preferred form of the welding torch.
Figure 3:
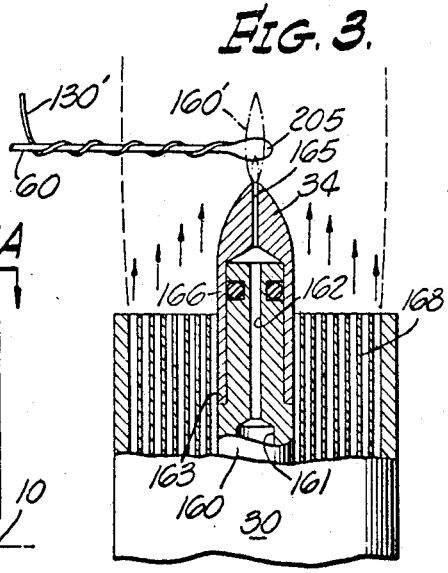
FIG. 3 is a partial detail view illustrating the application of the flame to the point of welding or fusion.

FIG. 2 and 3 show the exemplary form of the torch 12 in greater detail. The torch 12 has a base 140 having feet 142 and 144. Shielding-gas tube 30 engages the upper end of cylindrical member 150, these parts being connected sealed together by the O-ring seal 154. Formed within the member 150 are bores 156 and 158 to which the tubes 18 and 20 are respectively connected. The reducing shielding gas enters through tube 18 in which is provided valve 175, controlled by stem 22 and knob 26, as shown in FIG. 1, and FIG. 2A.

Numeral 159 designates a larger central bore in member 150 in which is press fitted tube 160, having bore 161 and smaller bore 162 at its end. Tube 160 is smaller at its upper end having an annular shoulder 163 and mounted on the end is bullet nosed torch tip 34 having bore or orifice 165 of the desired size. Tip 34 is sealed to tube 160 by means of O-ring 166.

Numeral 168 designates a laminar flow element in tube 30 which may be of a typical or conventional type, for distributing the flow of inert gas. The laminar flow element might be formed from bonding together a large number of very small tubes with their axes parallel.

Figure 2A:
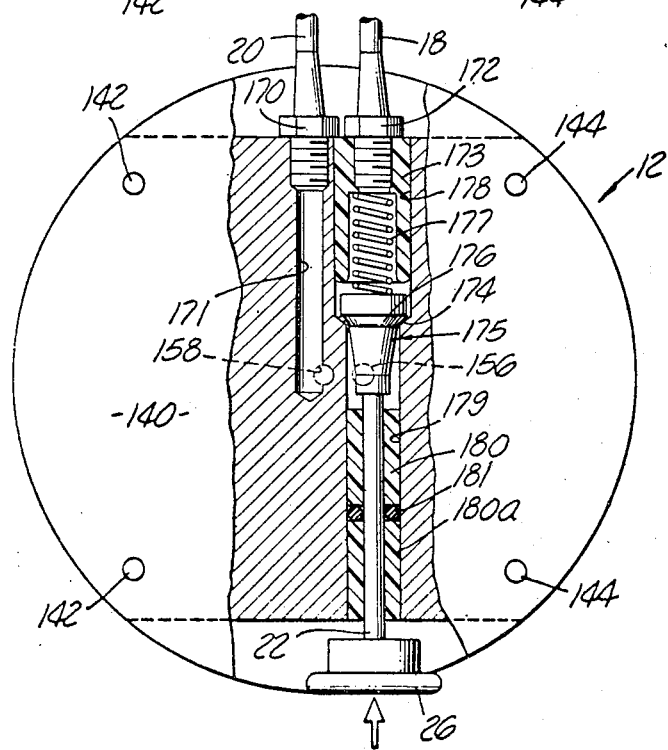
FIG. 2A is a sectional view taken along line 2A—2A of FIG. 2.

The oxygen hydrogen mixture is supplied through tube 20 and fitting 170 shown in FIG. 2A and bore 171 to bore 158, and to the torch tip. The shielding gas is supplied through tube 18, fitting 172, plastic housing 173 and valve seat 174. Valve 175 cooperates with seat 174 and carries sealing O-ring 176. Valve member 175 is operable by stem 22 and is biased in closing direction by spring 177 in bushing 173. Bushing 173 is in bore 178 communicating with smaller bore 179 in which are press fitted plastic bushings 180 and 180a and stem sealing O-ring 181. As may be seen inert shielding gas flows to the laminar element 168 only when knob or button 26 is pressed.

Referring now more specifically to FIGS. 4, 5, 6 and 7 which show the fixture holder 72 in greater detail, as will be observed in FIG. 4, the part 117 of the mandrel 116 is of a diameter to fit into the tapered nose 114 of the collet 112, the shank of the screw 118 being received in a slot 180 in the nose 114. Numeral 182 designates a suitable holder for the piece or section of lead wire to which the coil winding end is to be welded. The coil or magnet wire is ordinarily much finer than the lead wire which is not herein insulated. The holder 182 comprises a lever arm 184 which is pivoted at an intermediate point on a pivot pin 186 in an axial slot 188 in the collet 112, as shown in FIG. 4. The nose of lever 184 is rounded, as shown at 192, and in this nose part there is a groove 194 so that the section of lead wire can be engaged in and held in this groove while the nose 192 is bearing against the surface of the tapered collet end 114. See FIGS. 6 and 7.

In the side surface of the lever 184 is an angular slot 196, and a notch 197. The piece of lead wire 60, in addition to passing around the rounded nose 192 within the groove 194, passes along and through the diagonal slot 196 and then around the edge of the lever to the underneath side whence it comes past the shoulder of notch 197 with the end part of it held between the convolutions of the adjacent coil spring 200 which is suitably secured to the side part of the lever 184 as may be best seen in FIG. 7. The lever 184 is normally biased about its pivot 186 by a coil spring 204 received in a bore 206 in collet 112, so that the rounded nose 192 is urged against the exterior surface of the tapered end or nose part 114 of the collet 112.

The fixture 72 embodies two of the holding levers 182 as just described spaced 110° apart, being equally spaced from slot 181. FIG. 5 shows the slot 188 and the other spaced slot 188' for the other holding lever which need not be described in detail since they can be duplicates of each other.

The system described herein provides a gas flame (preferably dry oxy-hydrogen) burning within a protective inert atmosphere (preferably 5 percent hydrogen and 95 percent argon). The oxy-hydrogen flame issues from a small orifice as described above.

The protective atmosphere issues from the concentric surrounding orifice that is typically about seven-sixteenth inch diameter. The inclusion of 5 percent hydrogen in the shielding gas makes it somewhat reducing while remaining at too low a concentration to make the mixture flamable. The shielding gas mixture is comparatively costly and is normally valved on only during the actual welding operation. The oxy-hydrogen flame may be left burning continuously as a convenience to avoid the necessity for re-igniting. Since the flame is not readily visible, it is necessary to locate the torch so that operators or onlookers will not accidentally burn themselves. If desired, the flame may be extinguished and re-ignited for use.

The welding torch orifice size is determined by the size of the wires being welded. For coils in the range of 0.001 magnet wire welded to 0.003 Cupron (an alloy of 55 percent copper and 45 percent nickle), a 0.0075 inch I.D. needle is ideal. The oxy-hydrogen may be supplied from a standard device that electrically disassociates water to form a stoichiometric mixture of oxygen adn hydrogen or from suitable mixing equipment used in conjunction with bottled oxygen and bottled hydrogen. The pressure is adjusted to produce a flame that clears the end of the needle by 0.005 to 0.010 inches. The objective is to keep the flame as near the needle as possible without overheating the tip of the needle. The burning rate decreases as the flame moves away from the end of the needle — thus tending to create a stable flame. The burning rate is typically 1,000 in./sec. and may vary over the range of 906 inches per second to 1,270 inches per second for a 0.0075 typical orifice diameter.

The velocity of the shielding gases is preferably about 13 inches per second at a flow rate of about 4 SCFH. For the orifice size of seven-sixteenth inch diameter, the acceptable range of shielding gas flow rates is 2 to 8 SCFH. The shielding gas orifice should provide a practical uniformity in the gas flow and be of a size suitable for economy of gas and convenience of use. The size should not be reduced excessively, however, due to the tendency of higher gas velocity to blow out the flame and to avoid air incursion due to unavoidable turbulence.

As will be observed from FIG. 1, the wire 60 is held under tension between the hook 48 and the fixture 72 while the coil wire 130' is wound in a spiral fashion there around as by an operator holding an end of said coil wire 130' and shifting the same from hand to hand as it is wound around the lead wire 60. The wrapping of the coil wire is readily pitched and tensioned by hand to secure a tight wrap and to terminate a desired number of turns, e.g., approximately 10 turns, at a desired distance, e.g., approximately 0.1 inches. However, the tension is increased on the last approximately two or three turns and the coil wire is finally broken off by pulling at excess tension. This assures that the last two or three wraps of the coil wire are in especially tight contact with the lead wire. The ductility of the coil is such that there is essentially no spring back in the above operation. For such purpose, the operator is most conveniently positioned at the left of the platform 10 outwardly of the structure 42. The lead wire is then severed adjacent to the broken end of the coil wire, thus producing a rigidly held short cantilevered length of lead wire with the coil wire tightly wrapped thereabout. The aforementioned 10 turns of coil wire not only affords more than adequate strain relief but also permits a couple of successive attempts to achieve a weld in the event the operator accidentally ruins the end on the first attempt.

Then the wire holding bracket 42 is pivoted to its layed-down position and the welding torch 14 is positioned ready to make the weld, as shown.

The preferred welding technique advances the flame directly into the end of the aforementioned severed wire. The shielding gas valve button 26 is depressed and the torch is slowly advanced while the end of the wires are observed through the microscope to grow first red hot and then finally to fuse. The coil wires are spaced vertically in space to coincide with the base of the flame. The free flame in air is about 6,000°F. but the temperature actually produced in the weld joint is held to the low 2,000°F. area by the rapid conduction of heat away. If the torch is advanced too rapidly the wires tend to melt back excessively — the magnet wire particularly — with the consequence that the magnet wire melts back past where the lead wire has been brought to fusing temperature so that joining of the two materials does not occur. Slow movement of the torch avoids these difficulties.

In summary of the process or welding technique using the equipment described above.

The welding of the wires is accomplished by heating them to the fusion point while they are in intimate contact with each other. In a small coil, this is accomplished as described above by wrapping the magnet wire tightly around the lead wire which the latter is held in tension. The tight wrap may be realized by hand wrapping the magnet wire around the lead wire while the lead wire is held in tension to a degree suited to the wire size and strength. The ease of this operation, that is, the execution of the method, is greatly facilitated by the fixturing and magnification that has been described. The tight wrap of the magnet wire on the lead wire has significant purposes in realizing the following advantages:

1. The tightly wrapped turns adjacent to the actual weld provide a strain relief so that the actual weld does not receive any mechanical stress as a consequence of handling.

2. The tight wrapping also insures intimate contact of the two wires. This, in turn, serves two purposes. In the case of magnet wire which is very much smaller than the lead wire, there is a tendency for the magnet wire to melt before the lead wire reaches fusing temperature. The tight proximity of the two wires thus provides improved heat flow between them and helps to prevent overheating of the small wire. Additionally, when either of the wires melt, a small bead is formed which, if it is adjacent to the neighboring wire and if that wire is up to temperature, proceeds to wet that wire and thus provides a good weld.

The coil 130 as described normally has two winding ends. A section of lead wire is cut off and one end is positioned to be held in a spring such as the spring 200, as shown in FIG. 7 with the section of lead wire being placed in the diagonal slot 196 then around the rounded nose 192 of the lever 184 with the end part of the lead wire being held against the tapered nose 114 as described. The lead wire is now held, as shown in FIG. 1, its other end being grasped by the hook 48 and held in tension. One end of the coil wire is now wrapped around the lead wire and they are trimmed to a length, typically about one-sixteenth to one-eighth inch beyond the fixture. The torch 12 is slidable on the base 10 or other suitable support in a manner to bring it into position adjacent the wire, as shown in FIG. 1.

For smaller wire sizes, the operator will be watching through the binocular microscope 80 and will move the torch away immediately when the wire is observed to fuse or glow white hot. The wire is then microscopically examined for a sound weld.

Additional assurance is advantageously built into this system in the form of a built-in bridge which indicates coil resistance the instant both leads are welded. As aforesaid, the heating of the wires to the fusing temperature in the reducing inert gas atmosphere not only eliminates oxidation, but also acts to decompose and vaporize the insulation. This is a significant improvement realized by the system.

The automatic insulation removal occurs a few milliseconds prior to the actual fusion of the wires. The extremely hot gas flame which may be at a temperature of approximately 6,000°F. sets up such a high heat gradient that the insulation is largely vaporized before the wire melts. The Telfon (polytetrafluorethylene) is completely decomposed into various low weight monomers, $C_2F_4$ being predominant, but others such as $C_3F_6$ also being present. Upon heating Pyre ML (inert polyimide polymer) over 1500°F. it is largely decomposed into gaseous products.

After the weld is made as described and the torch withdrawn, holding fixture 72 is rotated through 110° for welding the lead to the other extending coil end. The process described above is then repeated on ensuing coils. By means of the commutator 108 and attached resistance bridge, the welds can be tested as well as the resistance of the coils.

From the foregoing, those skilled in the art will readily understand the nature and construction of the fixturing apparatus or equipment and the manner in which it is utilized and in which it contributes to the execution of the welding process or technique. Further, those skilled in the art will readily understand the manner in which all of the objectives and advantages of the invention are realized, as well as the many additional advantages that are apparent from the detailed description.

The foregoing disclosure is representative of a preferred exemplary form of the invention, and is to be interpreted in an illustrative rather than a limiting sense, the invention to be accorded the full scope of the claims appended hereto. It should be understood that in practicing the invention, variations may be made in the heating means and, of course, also in the construction of the illustrative torch. Variations may also be made in details of construction of the fixturing and automating such movements as are stated to be manual, as described herein. For example, the movement of the torch can be automated so that the wire-to-orifice distance is controlled with great precision; and, similarly, the gas velocity of the torch. Some of such automation may include the use of a photodiode in the circuitry to sense the wire temperature and to automatically control the mechanical movement of the torch at the proper time or to interrupt the flame. Such automation would also make it unnecessary to control some of the other variables.

I claim:

1. A welding torch comprising a means having a burner tip, a stoichometric mixture of hydrogen and oxygen, a means for supplying said stoichiometric mixture of hydrogen and oxygen to the burner tip, a shielding gas mixture, and a means for supplying said shielding gas mixture around the flame to prevent oxidation, said shielding gas mixture being an inert gas.

2. A welding torch as in claim 1 wherein said stoichiometric mixture of hydrogen and oxygen is further characterized as a hydrogen rich mixture of hydrogen and oxygen.

3. A torch as in claim 1 where the shilding mixture comprises substantially 5% hydrogen and 95% argon.

4. A torch as in claim 1 where the shielding gas mixture comprises a combination of reducing and non-oxidizing gases.

5. A torch as in claim 1 having a burner tip provided with an orifice in the range of 0.003 inches to 0.010 inches in diameter.

6. A torch as in claim 5 including a cylindrical means around the burner tip for supplying shielding gas, said cylindrical means having a diameter in the range of five-sixteenths to 1-½ inches.

7. A welding torch comprising a means having a burner tip, a stoichiometric mixture of hydrogen and oxygen, a means for supplying said stoichiometric mixture of hydrogen and oxygen to the burner tip, a shielding gas mixture, means for supplying said shielding gas mixture around the flame to prevent oxidation, said shielding gas mixture being an inert gas, and laminar flow means for evenly distributing the flow of shielding gas.

8. A welding torch employing a flammable mixture of gases for vaporizing insulation on a fine wire without destroying the wire and employing an inert shielding gas to prevent oxidizing the uninsulated wire, said torch comprising:
   a burner tip having a longitudinal axis;
   first conduit means connected to said flammable mixture of gases for supplying the flammable mixture of gases to said burner tip to produce a flame;
   laminar flow means including a plurality of coaxial cylinders having longitudinal axes aligned with and around the axis of the burner tip and terminating adjacent the burner tip; and
   second conduit means connectable to said inert shielding gas for supplying the inert shielding gas to said laminar flow means for distributing the flow of inert shielding gas around said flame at said burner tip.

9. A welding torch as in claim 7 wherein the laminar flow means for distributing the flow of shielding gas includes cylindrical means positioned around the burner tip.

* * * * *